United States Patent [19]

Sato

[11] 4,210,688

[45] Jul. 1, 1980

[54] PRESSURE SENSITIVE LABEL STRIP FOR USE IN A LABEL PRINTING MACHINE

[75] Inventor: Yo Sato, Tokyo, Japan

[73] Assignee: Kabushiki Kaisha Sato, Tokyo, Japan

[21] Appl. No.: 926,704

[22] Filed: Jul. 20, 1978

Related U.S. Application Data

[63] Continuation-in-part of Ser. No. 867,007, Jan. 5, 1978, abandoned.

[30] Foreign Application Priority Data

Mar. 28, 1977 [JP] Japan ............................ 52-033374

Feb. 13, 1978 [JP] Japan ............................ 53-015723[U]

[51] Int. Cl.² ........................ G09F 3/00; B65D 65/30; B32B 3/16

[52] U.S. Cl. ........................ 428/41; 428/137; 428/915; 40/2 R; 206/820; 283/21; 156/256

[58] Field of Search ........................ 428/40–42, 428/136, 192, 915, 137, 138; 206/820, 824, 390, 460; 156/256, 263, 541; 40/2 R; 283/18, 21

[56] References Cited

U.S. PATENT DOCUMENTS

| | | | |
|---|---|---|---|
| 3,783,083 | 1/1974 | Jenkins | 428/42 |
| 3,852,139 | 12/1974 | Jenkins | 428/42 |
| 3,863,761 | 2/1975 | La Mers | 40/2 R X |
| 3,920,122 | 11/1975 | Koehlinger et al. | 206/820 X |
| 3,957,562 | 5/1976 | Hamisch | 206/820 X |
| 4,061,808 | 12/1977 | Sato | 428/41 X |

*Primary Examiner*—Marion E. McCamish
*Assistant Examiner*—Alexander S. Thomas
*Attorney, Agent, or Firm*—Ostrolenk, Faber, Gerb & Soffen

[57] ABSTRACT

A pressure sensitive label strip comprising a tape-like strip of label material that is overlaid on a tape-like strip of backing material; parting cut lines extend transversely across the strip of label material at regular intervals so as to form a plurality of unit label pieces; feeding cut lines in the strip of backing material define a plurality of feeding tongues having their connected portions oriented in the direction of forward motion of the label strip, and the feeding tongues are at positions that either correspond to the positions of the pairs of feeding cut lines of the label material or that roughly correspond.

23 Claims, 20 Drawing Figures

PRESSURE SENSITIVE LABEL STRIP FOR USE IN A LABEL PRINTING MACHINE

CROSS REFERENCE TO RELATED APPLICATION

This is a Continuation-in-Part of application Ser. No. 867,007, filed Jan. 5, 1978, now abandoned.

BACKGROUND OF THE INVENTION

1. Field of the Invention

This invention relates to a tape-like, pressure sensitive label strip for use in a label printing and dispensing machine (hereinafter referred to simply as a "label printing machine"). More particularly, the invention relates to the feeding cuts in the label strip by which the label strip is advanced in the label printing machine as they are engaged with the feeding pins formed on a feeding roller.

2. Description of the Prior Art

A label strip of the type to which the invention relates comprises one elongated length of label material, which has an imprintable top surface and an adhesive coated rear surface, and it comprises a second elongated length of backing material with a release material surface to which the adhesive coated surface of the label material is applied.

There are two common systems in use for advancing label strips by using feeding pin rollers. In the label strip folding edge system, the complete two layer label strip is directed forward of the platen of the label printing machine and the backing material of the label strip is folded rearward in front of the platen. Only the strip of backing material is then brought into engagement with the pins of a feeding roller that is located to the rear of the platen. Rotation of the feeding roller in engagement with the label strip backing material pulls the whole label strip forward through the machine. Label pieces from the strip of label material are peeled from the strip of backing material at the label strip folding edge in front of the platen.

In the other push-separate-pull system, the complete two layer label strip is first engaged by the feeding pins of a feeding roller (first engagement section) before the label strip has reached the platen. This pushes the whole label strip forward. The layer of backing material is then folded into a loop in the narrow space of a folding section in front of the platen. As in the folding edge system, only the layer of backing material is brought into engagement with the feeding pins of the feeding roller (second engagement section), and the layer of backing material is then dragged through the label printing machine. In this system the label pieces are also peeled from the backing material in the folding section in front of the platen.

In both systems, the strip of backing material is folded back and is brought into engagement with the pins of the feeding roller at least once for advancing the label strip.

In order to engage the label strip, which is comprised of laminated layers of a label material and a backing material, with the feeding pins of a feeding roller, the label strip must be provided with some feeding cuts. Such cuts are disclosed, for example, in U.S. Pat. No. 3,501,365. In conventional layered label strips of the above described kind, the feeding cuts in the label strip form feed roller pin engageable feeding tongues to be engaged by the feeding pins of the roller. The cuts are oriented such that the free or cut end portions of feeding tongues that are formed in the strip of backing material are oriented toward the front or downstream side or advancing direction of the advancing label strip, while the connecting or uncut attached portions of the feeding tongues are oriented toward the rear or upstream side or trailing direction of the advancing label strip.

When the feeding tongues in the strip of backing material are formed in the conventional manner by cutting the forward ends of the tongues, the feeding tongues are liable to be pushed fully upright owing to the forward inertia of the backing material during the peeling of labels which occurs through the rearward folding of the backing material. Especially when the label strip is being advanced rapidly, the feeding tongues are raised upright, and they contact the bottom cover of the label printing machine. This may cause the cut ends of the feeding tongues to be torn just after being folded rearwardly. Owing to this tearing of the feeding tongues, the later engagement of the strip of backing material with the pins of the feeding roller becomes impossible, and the label strip cannot be advanced through the machine.

BRIEF SUMMARY OF THE INVENTION

It is the principal object of the present invention to provide an improved label strip with feeding tongues.

It is another object of the invention to provide such a label strip which protects the feeding tongues of the backing material from tearing when the label strip is moved forward in a label printing machine.

Another object of the present invention is to provide a pressure sensitive label strip which is comprised of a layer of a label material and a layer of a backing material, and which label strip can be brought into smooth engagement with the feeding pins formed on a feeding roller so as to efficiently advance the label strip through a label printing machine.

A further object of the present invention is to provide a pressure sensitive label strip which has improved feeding cuts and which can be produced without difficulty at low cost, and which is effective in operation.

Yet another object of the invention is to provide such a label strip wherein the feeding cuts may be easily made, by machine or otherwise, in both the layer of label material and the layer of backing material.

In accordance with the present invention, the pressure sensitive label strip comprises a strip of tape-like imprintable label material having an adhesive layer on its rear side and a strip of tape-like backing material having a release layer on its front side. The adhesive layer on the label material is overlaid on the release layer of the backing material. In a label printing machine, after the label material is imprinted, the label material is peeled from the backing material by rearward folding of the backing material.

A plurality of parting cut lines extend transversely across the label material strip and they are spaced at regular intervals along the strip so as to form a plurality of unit label pieces. A plurality of feeding tongues having their free or unattached ends oriented rearwardly or upstream on the label strip are formed in the strip of backing material at positions corresponding to and beneath and crossing the parting cut lines of the strip of label material. This is accomplished by having the feeding tongues formed by feeding cuts in the above described shape. The feeding tongues formed in the backing material are each in the shape of an unclosed geometric form, for example, a rounded U-shape, a squarish U-shape or a V-shape.

According to another aspect of the present invention at least a pair of feeding cut lines are formed in the strip of label material at each of the parting cut lines in the strip of label material in a manner to cross each parting cut line. Each pair of feeding cut lines in the strip of label material cooperates with the respective parting cut line to define a feeding tongue in the label strip.

In a further development of this aspect, according to one version of the invention, the space between each pair of the feeding cut lines formed in the label material is made different from the space between each of the pair of feeding cut lines formed in the backing material, e.g. the space may be smaller or larger.

According to a second version of the invention, the space between the pair of cut lines in the label material is the same as the space between the corresponding pair of cut lines in the backing material. In a further development of the second version, the corresponding pairs of cut lines in the strips of label and backing material overlie each other.

BRIEF DESCRIPTION OF THE DRAWINGS

Other objects and features of the present invention will be apparent from the following description of the invention with reference to the accompanying drawings, in which:

FIGS. 1 to 4 show a first embodiment of a first version of a pressure sensitive label strip according to the present invention, wherein:

FIG. 1 is a perspective view of a part of the first embodiment of the first version of the label strip;

FIG. 2 is a plan view of the same label strip;

FIG. 3 is a vertical cross-sectional view taken on the line III—III in FIG. 2; and FIG. 4 is also a vertical cross-sectional view taken on the line IV—IV in FIG. 2;

FIGS. 12 to 15 show a first embodiment of a second version of a pressure sensitive label strip according to the present invention, wherein:

FIG. 12 is a perspective view of a part of the first embodiment of the second version of the label strip;

FIG. 13 is a plan view of the same label strip;

FIG. 14 is a vertical cross-sectional view taken on the line XIV—XIV in FIG. 13; and FIG. 15 is also a vertical cross-sectional view taken on the line XV—XV in FIG. 13;

FIGS. 16 and 17 show the advancement of a label strip of the first embodiment of the second version of the present invention, wherein:

FIG. 16 is a schematic plan view showing advancement of a feeding pin of a feeding roller and of the label strip of the invention; and FIG. 17 is a vertical cross sectional view of the elements shown in FIG. 16;

DESCRIPTION OF THE PREFERRED EMBODIMENTS

Figure 1:
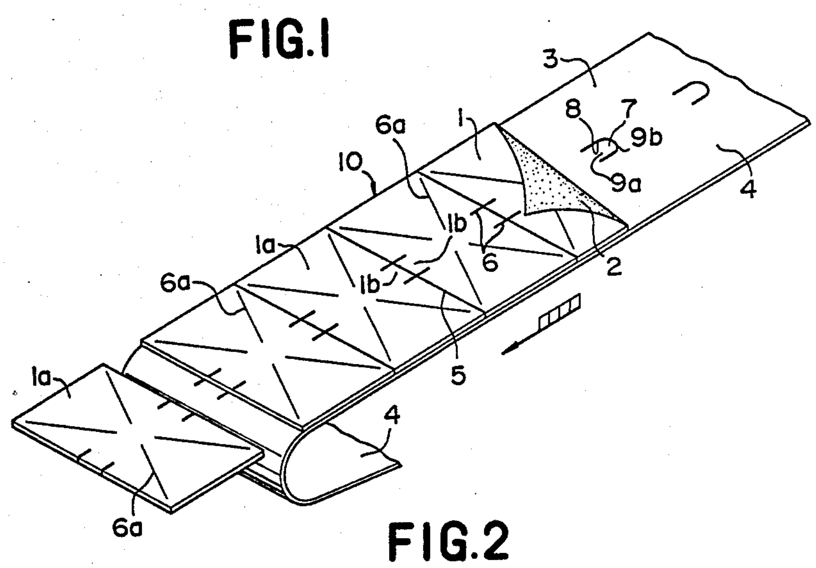
Figure 2:
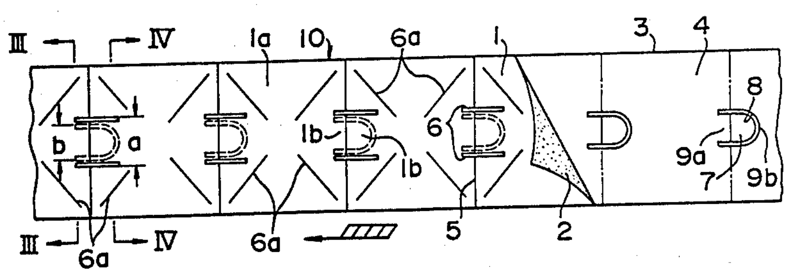
Figure 3:
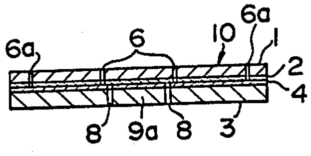
Figure 4:
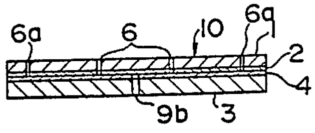

The first embodiment of the first version of label strip 10 is shown in FIGS. 1 to 4. The label strip 10 comprises a long, thin strip layer of label material 1 and a long thin strip layer of backing material 3. The rear surface of the layer of label material 1 is provided with an adhesive coating layer 2, while the front surface of the backing material 3 is provided with a release layer 4 so as to facilitate the peeling of the label material 1 from the backing material 3. The rear surface of the layer of label material is overlaid on the front surface of the layer of backing material.

The strip of label material 1 has a plurality of transverse parting cut lines 5 spaced at regular intervals along its length. This produces a large number of unit label pieces 1*a* that are arrayed along the length of the label material strip. A pair of parallel, short length, slightly spaced apart feeding cut lines 6 cross each parting cut line 5 at right angles and they are symmetrically spaced about the center of each cut line 5. Feeding tongues 1*b* are formed on both sides of each parting cut line 5, on the adjacent trailing and leading edges of two adjacent unit label pieces 1*a*.

Feeding tongues 7 are formed in the strip layer of backing material 3 by defining therein feeding cut lines 8 having an open-ended, geometric U-shape. The position of each feeding tongue 7 corresponds to and underlies a pair of respective feeding cut lines 6 that are formed at a parting cut line 5.

The width a between the feeding cut lines 6 is somewhat larger than the width b between the end portions or arms of the U-shaped feeding cut line 8. The widths a and b have the relationship $a>b$. More particularly, the width a between the two feeding cut lines 6 may be, for example, about 2.6 mm to 3.4 mm and the width b of the U-shaped feeding cut line 8 may be about 2.4 mm.

The connected portion 9*a* of the almost U-shaped feeding tongue 7 is joined to the layer of backing material 3. The connected portion 9*a* is directed in the forward, downstream or leading direction of the advancing motion of the label strip 10. The arcuate, unconnected free end 9*b* of the tongue 7 is directed in the rear, upstream or trailing direction. The connected portion 9*a* of each feeding tongue 7 is brought into engagement with a feeding pin 22 of a feeding roller 21 (described later). This bends the feeding tongues 7 upright forming pressure receiving faces.

Further, if desired, other cut lines 6*a* can be formed in each unit label piece 1*a* of the label material 1. The cut lines 6*a* prevent the intentional replacement of a label that has been applied on a commodity since only one section of the label at a time of an applied label can be intentionally removed.

Figure 5:
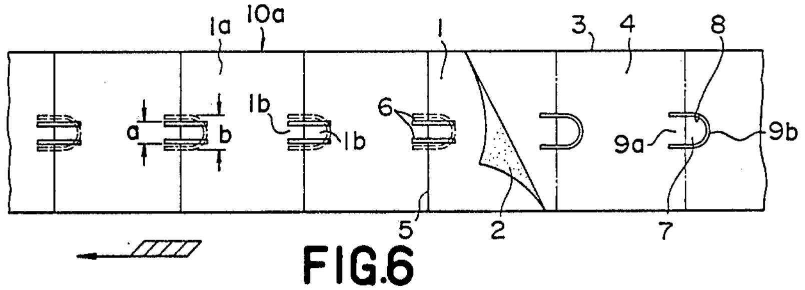
FIGS. 5 to 8 are plan views of pressure sensitive label strips showing the second to fifth embodiments of the first version of the present invention, respectively, and in which a part of the label material is removed in each Figure.

In the second embodiment of the first version, as shown in FIG. 5, the label strip 10a has the same elements as the label strip 10. The relationship between the widths a and b in the second embodiment is a<b, which is the reverse of this relationship in the first embodiment. However, the function of feeding for the tape like label strip (described later) can still be attained. More particularly, for example, the width b of the U-shaped feeding cut line 8 that is formed in the backing material 3 may be the same as that of the first embodiment while the width a between the two feeding cut lines 6 is made narrower.

In both of the first and second embodiments of the first version, the two feeding cut lines 6 in the label material 1 do not overlie or conform to the respective U-shaped feeding cut line 8 so that the respective cut lines do not pass through the label material 1 and the backing material 3 at same positions. The reason for the positional disagreement is that, when these cuts are defined, great mechanical skill would be required in order to cause the positions of the cut lines to precisely coincide. This is because the cut lines on each layer of material must be separately formed by different pattern cutter rollers, and the disagreement is a consequence of inevitable errors of cutter roller settings.

Figure 6:
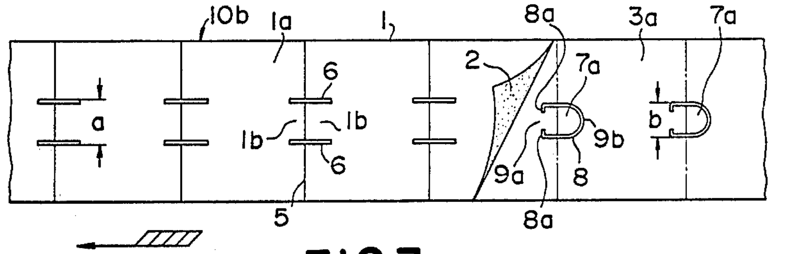
Figure 7:
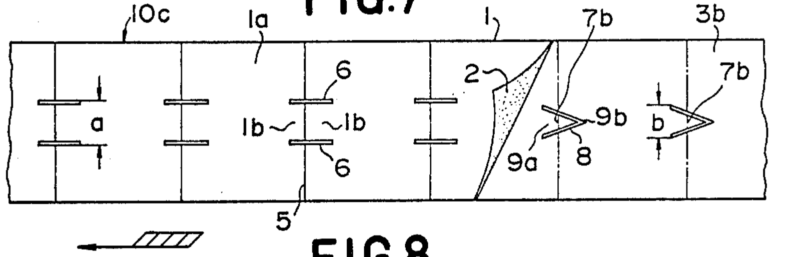
Figure 8:
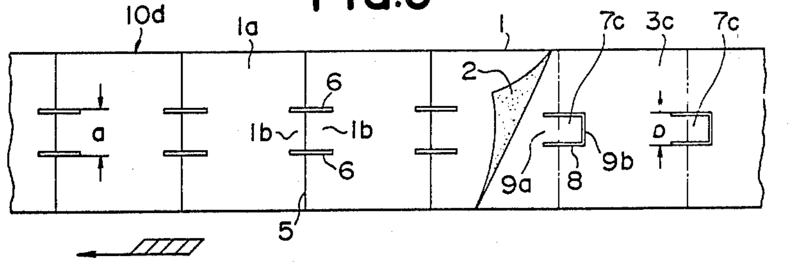

In the third, fourth and fifth embodiments of the first version of the present invention, shown in FIGS. 6 to 8, respectively, the parting cut lines 5, the feeding cut lines 6 and the feeding tongues 1b that are formed by the lines 5 on the strips of label material 1 of label strips 10b, 10c and 10d, are the same as those described above in the first embodiment of label strip 10. Accordingly, further description of them is omitted.

In the strip of backing material 3a of the third embodiment of the first version, as shown in FIG. 6, the feeding tongue 7a is defined by a modified U-shaped feeding cut line 8. The arcuate end portion 9b of the feeding cut line 8 is oriented toward the trailing or rear side of the label strip 10a as it is advanced, and the connected portion 9a is oriented toward the leading or forward end of the strip, as in the first embodiment. On the insides of the end portions of feeding cut line 8 at the connected portion 9a, arcuate portions 8a are formed for preventing the strip of backing material 3a from tearing.

In the strip of backing material 3b of the fourth embodiment of the first version, as shown in FIG. 7, the feeding tongue 7b is defined by an unclosed V-shaped feeding cut line 8. The apex or closed end 9b of the feeding cut line 8 is oriented toward the trailing or rear end of the label strip 10b as it is advanced, while the connected portion 9a is disposed toward the leading or forward end, also as in the first embodiment.

In the fifth embodiment of the first version of the present invention shown in FIG. 8, the feeding tongue 7c is defined in the backing material 3c by an unclosed generally squarish or rectangular, U-shaped feeding cut line 8. The open end portion 9b of the feeding cut line 8 is oriented toward the trailing or rear end of the label strip 10c as in the foregoing embodiments, and the connected portion 9a is disposed toward the leading or front end.

The widths a of the cuts in the label materials 1 of the third, fourth and fifth embodiments are larger than the widths b of the cuts in the backing materials 3, just as in the first embodiment. However, the relation between the widths a and b of the cuts can be reversed into a<b (not shown) as in the second embodiment.

Further, if necessary, other cut lines (not shown), like lines 6a, for preventing intentional replacement of the label may be defined in each unit label piece 1a of the label material 1.

The advancement of any embodiment of the label strip of the present invention, like strip 10, is now described with reference to FIG. 9, in which the label strip 10 is advanced through a label printing machine that uses a P.S.P. (push-separate-pull) system.

Figure 9:
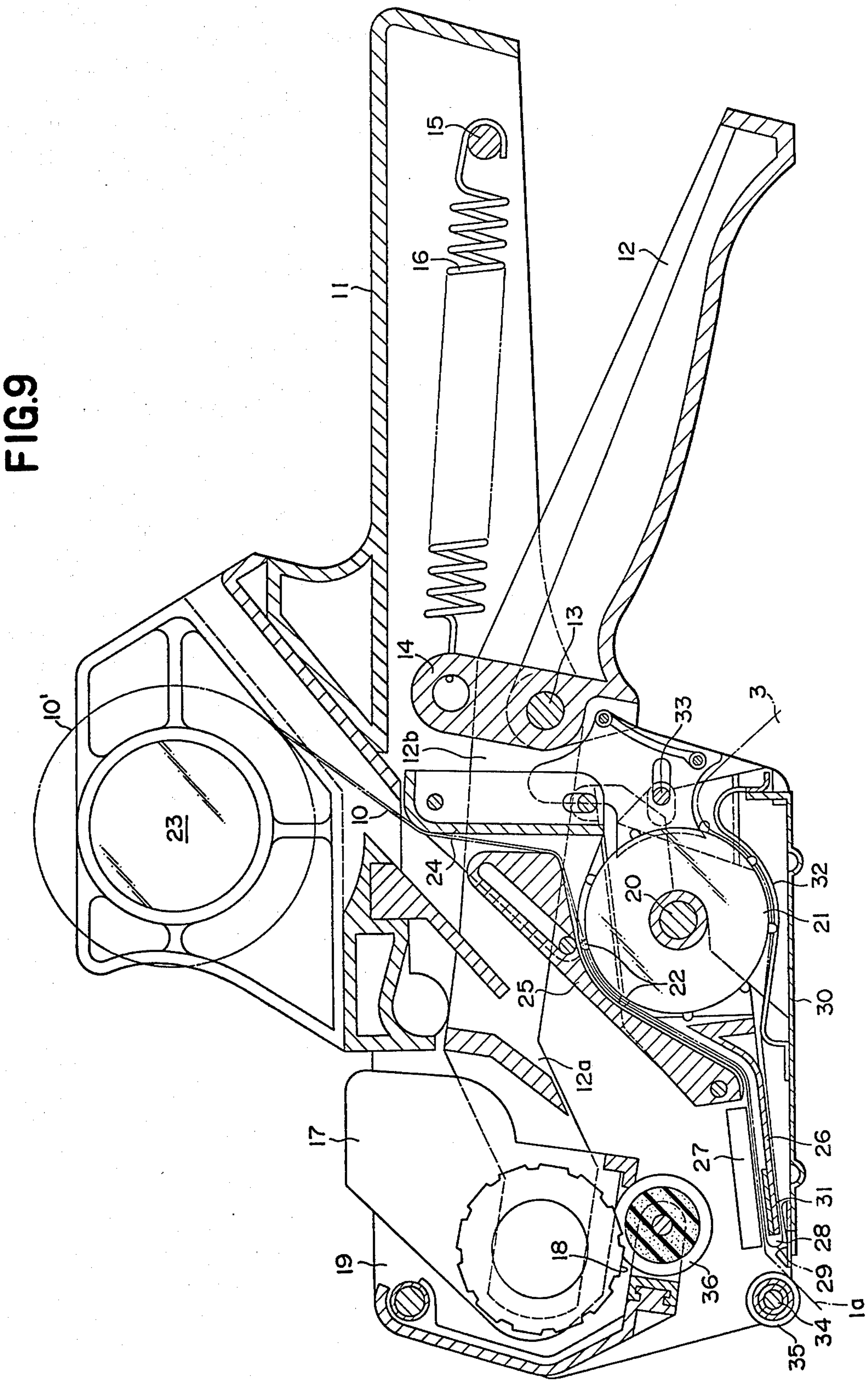
FIG. 9 is a vertical cross-sectional view of a label printing machine, in which the machine frame on the near side is removed so as to show the advancement of the label strip.

The label printing machine shown in FIG. 9 comprises a hand lever 12 that is pivotally secured to a pivot shaft 13 that is formed on a machine frame 19. An integrally formed hand grip 11 extends rearwardly from the frame 19. A return spring 16 is stretched between spring supporting members 14 and 15 that are respectively formed on the hand lever 12 and the hand grip 11. The force of spring 16 returns the hand lever 12 to the original downward rest position when the lever is released after being squeezed.

The hand lever 12 extends forward (to the left) of its pivot shaft 13, and this section of the hand lever is comprised of a printing section 12a remote from shaft 13 and an actuating section 12b nearer to the shaft 13. The printing section 12a carries a printing head 17 which carries a plurality of stamp belts aligned side by side so as to print a line of figures. The actuating section 12b is provided with a known sector drive gear (not shown) near the pivot shaft 13.

Figure 10:
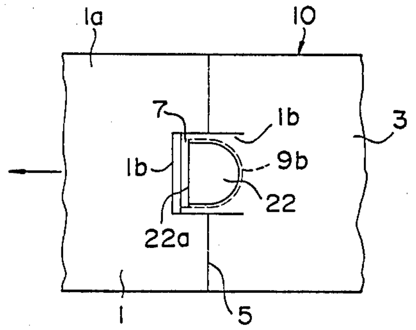
FIG. 10 is a plan view of the main parts of the first embodiment of the first version of the label strip and showing a feeding pin formed on the feeding roller, for showing the advancement of the label strip.
Figure 11:
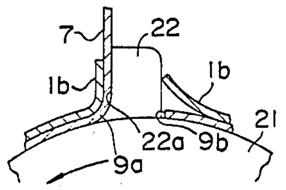
FIG. 11 is a cross-sectional side view of the elements shown in FIG. 10.
Figure 12:
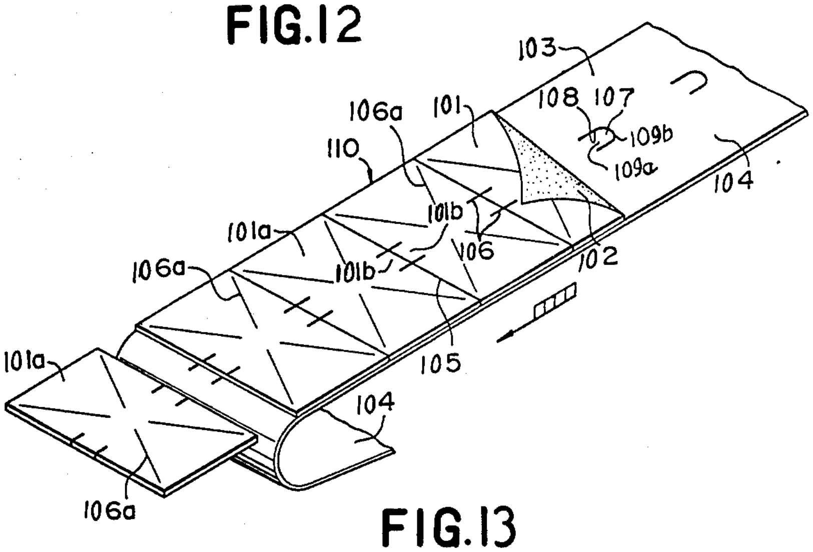
Figure 13:
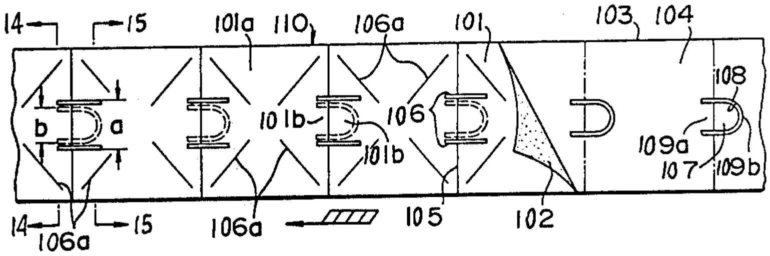
Figure 14:
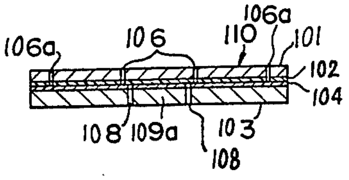
Figure 15:
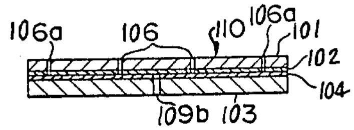

A main shaft 20, which is nonshiftably attached to the machine frames 19, rotatably supports a feeding roller 20 having a pawl wheel (not shown) that is engaged with the drive gear of the actuating section 12b of the hand lever 12. The circumferential surface of the feeding roller 21 is provided with a plurality of projecting feeding pins 22 that are spaced at regular intervals for advancing the tape-like label strip 10 of the present invention. As shown in FIGS. 10 and 11, the horizontal or transverse cross-section of each feeding pin 22 is semi-circular, with the planar portion of the pin 22 being oriented toward the leading or downstream direction (shown by an arrow) forming a feeding surface 22a for advancing the label strip 10.

When the label strip 10 is advanced through the label printing machine during operation thereof, a rolled label strip 10' is supported by a label supporting section 23 of the machine. The free end of the label strip 10 is passed through the space between the feeding roller 21 and a label pushing member 25 by way of a label guide member 24. The free end of the label strip is further led onto a platen 26 which is supported inside the machine frame in opposition to the printing head 17. In this advancing of the label strip 10, the feeding cut lines 8 and 6 in the strip of the backing material 3 and of the label material 1 are first brought into engagement with the feeding pins 22 on the feeding roller 21 and the label pushing member 25 is then fitted over the upper surface of the label strip 10.

When the hand lever 12 is released after it is squeezed, the feeding roller 21 is turned counterclockwise intermittently by the length of one label piece. This correspondingly advances the label strip 10. During the advancing of the label strip 10, as shown in FIGS. 10 and 11, as each feeding tongue 7 of the backing material 3 engages a feeding pin 22, it is raised up by the feeding pin 22. To ensure that each feeding tongue 7 is bent upright along the connected portion 9a, it comes into surface contact with the flat feeding face 22*a* of the feeding pin 22. Therefore, any instability in feeding owing to concentrated loading can be eliminated by distributing the load throughout the entire contacting surfaces. As a feeding pin 22 lifts a feeding tongue 7 of the backing material 3, it is also inserted into the space defined between the overlying feeding cut lines 6 and the associated parting cut line 5, and the feeding pin 22 also lifts the feeding tongues 1*b* in rectangular shape on both sides of the parting cut line 5. Thus, the leading or front feeding tongue 1*b*, i.e. at the trailing end of the associated label piece 1*a* is bent upright with the other feeding tongue 7 of the backing material 3. The pushing force of the feeding pin 22 can be borne by both of the feeding tongues 7 and 1*b* when the label strip 10 is advanced.

As the label strip 10 is advanced onto the platen 26, its upper surface is printed by the type faces 18 of the printing head 17 as the head 17 descends upon the squeezing of the hand lever 12. There is an inking roller 36 for applying ink to the type faces 18 of the printing head 17 as the printing head moves to the platen.

After the printing step, the layer of backing material 3 of the label strip 10 is shifted in front of the platen 26 and is bent downwardly and rearwardly forming a bending portion 29 of a loop in the narrow space 28 between the bottom cover 30 and a keep plate 27 holding the platen 26 therebetween. There is a locking device for the bottom cover 30.

Once it is bent rearwardly, the backing material 3 is further led rearwardly and is brought into engagement with the feeding pins 22 of the above-described feeding roller 21, so that the label strip 10 can be pulled by the roller 21. Two label pushing members 32 are attached on the inside of a bottom cover 30, which is pivotally secured to a pin 34 that is attached to the lower front end of the machine body. The position and shape of the label pushing members 32 correspond to those of the lower face of the feeding roller 21. Thus, both side edge portions of the backing strip 3 are pressed against the feeding roller 21, and the backing strip 3 is brought into engagement with the feeding pins 22 of the feeding roller 21 so as to be passed out from the rear portion of the machine body.

The just printed unit label piece 1*a* is peeled from the bending portion 29 of the backing material 3 and is pushed out beneath the lower surface of an applicator roller 35 so as to be applied to the surface of a commodity.

When the layer of backing material 3 is bent rearwardly, the feeding tongue 7 is turned from facing forwardly to facing rearwardly. However, tearing at the ends of cut line 8 owing to the inertia of forward movement does not occur since the feeding cut line 8 extends in the rearward direction (and the arcuate portion at the free end of the feeding tongue 7 is oriented in the rearward direction). Further, the feeding tongue 7 is not set up, but is instead laid down after the backing material 3 is bent rearwardly. As a result, the backing material 3 can be smoothly passed through the tapered narrow space 31 between the platen 26 and the bottom cover 30 in the lower front portion of the machine body.

If the feeding tongue 7 had been oriented to face forward, as in the conventional art, the free end of the feeding tongue 7 would be caught by the end portion of the narrow space 31 and be drawn up. The ends of the cut line at the connected end 9*a* would be pulled, and the feeding tongues 7 would be torn.

As described above, the first version of the label strip of the present invention is comprised of a layer of label material and a layer of backing material which are laminated together, and the label material is peeled from the backing material by bending the layer of backing material rearwardly in the label printing machine.

The backing material is provided with feeding tongues of an unclosed shape by the feeding cut lines. The position of each feeding tongue formed in the backing material roughly corresponds to but does not always precisely correspond to the position of each pair of feeding cut lines formed in the label material. Therefore, although the feeding cut lines of the label material and the backing material may be formed by means of separate pattern cutter rollers, enabling the line cutting process to be carried out quite easily, the label strip still has excellent shifting characteristic for the use in the label printing machine.

The first embodiment of the second version of label strip 110 is shown in FIGS. 12–15. The label strip 110 comprises a long, thin strip layer of label material 101 and a long thin strip layer of backing material 103. The rear surface of the layer of label material 101 is provided with an adhesive coating layer 102, while the front surface of the backing material 103 is provided with a release layer 104 so as to facilitate the peeling of the label material 101 from the backing material 103. The rear surface of the layer of label material is overlaid on the front surface of the layer of backing material.

The strip of label material 101 has a plurality of transverse parting cut lines 5 spaced at regular intervals along its length. This produces a large number of unit label pieces 101*a* that are arrayed along the length of the label material strip. A pair of parallel, short length, slightly spaced apart feeding cut lines 106 cross each parting cut line 105 at right angles and a pair of lines 106 are symmetrically spaced about the center of each cut line 105. Feeding tongues 101*b* are formed on both sides of each parting cut line 105, on the adjacent trailing and leading edges of two adjacent unit label pieces 101*a*.

Feeding tongues 107 are formed in the strip layer of backing material 103 by defining therein feeding cut lines 108 having an open-ended, geometric, e.g. U-shape. The position of each feeding tongue 107 corresponds to and underlies a pair of respective feeding cut lines 106 that are formed at a parting cut line 105. This is in contrast to the first version wherein the corresponding feed lines do not overlie. The connected or attached portion 109*a* of this almost U-shaped feeding tongue 107 is joined to the layer of backing material 103. The attached portion 109*a* is directed in the forward, downstream or leading direction of the advancing motion of the label strip 110. The arcuate, unconnected free end 109*b* of the tongue 107 is directed in the rear, upstream or trailing direction. The connected portion 109*a* of each feeding tongue 107 is brought into engagement with a feeding pin 22 of a feeding roller 21 of the machine shown in FIG. 9. This bends the feeding tongues 107 upright forming pressure receiving faces.

Figure 16:
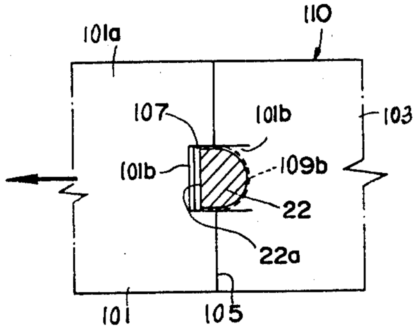
Figure 17:
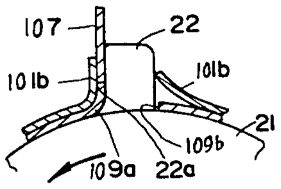

The advancement of the second version of tape-like label strip 110 in a label printing machine by using the above described push-separate-pull system is the same as in the various embodiments of the first version of the invention, and, therefore, it is not here described again. FIGS. 16 and 17 show advancement of the first embodiment of the second version correspondingly to the advancement of the first embodiment of the first version as shown in FIGS. 10 and 11.

Figure 18:
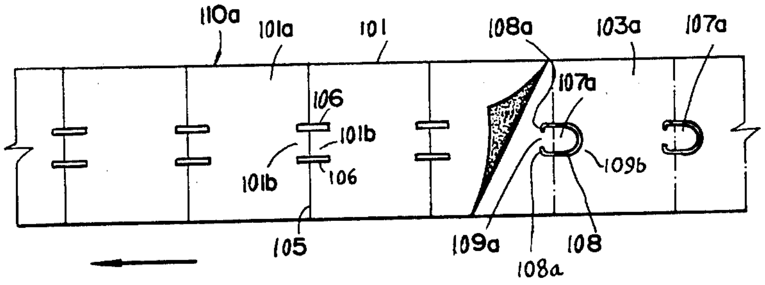
FIG. 18 is a partially exploded plan view of a second embodiment of the second version of a label strip according to the invention.
Figure 19:
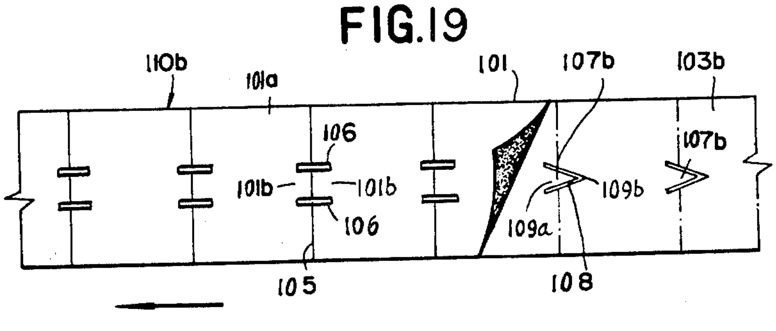
FIG. 19 is a partially exploded plan view of a third embodiment of the second version of a label strip according to the invention.
Figure 20:
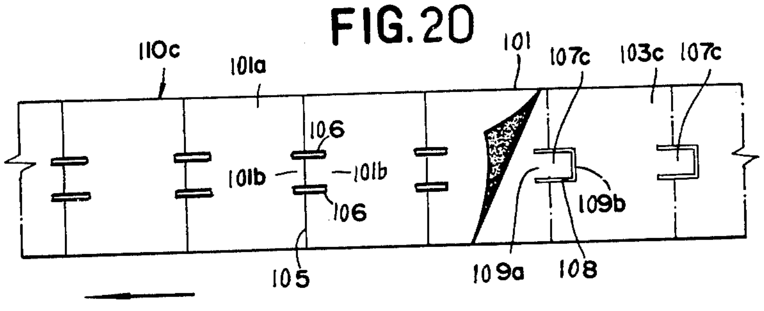
FIG. 20 is also a partially exploded plan view of a fourth embodiment of the second version of a label strip according to the invention.

In the second, third and fourth embodiments of the second version of the present invention, shown in FIGS. 18, 19 and 20, respectively, the parting cut lines 105 and the feeding tongues 101*b* that are formed by the parting cut lines 105 and by the feeding cut lines 106 of the strips of label material 101 of label strips 110*a*, 110*b* and 110*c*, are the same as those of the above described first version. Accordingly, further description of them is omitted.

In the strip of backing material 103*a* of the second embodiment of the second version, as shown in FIG. 18, the feeding tongue 107*a* is defined by a modified U-shaped feeding cut line 108. The arcuate end portion 109*b* of the feeding cut line 108 is oriented toward the trailing or rear end of the label strip 110*a* as it is advanced and the connected portion 109*a* is oriented toward the leading or forward end of the strip, as in the first embodiment of the second version. On the insides of the end portions of feeding cut line 108, arcuate portions 108*a* are formed for preventing the strip of backing material 103 from tearing.

In the strip of backing material 103*b* of the third embodiment of the second version, as shown in FIG. 19, the feeding tongue 107*b* is defined by an unclosed V-shaped feeding cut line 108. In this modification, the apex or closed end 109*b* of the feeding cut line 108 is oriented toward the trailing or rear end of the label strip 110*b* as it is advanced, while the connected portion 9*a* is disposed toward the leading or forward end, also as in the first embodiment of the second version.

In the fourth embodiment of the second version of the present invention shown in FIG. 20, the feeding tongue 107*c* is defined by an unclosed generally squarish or rectangular, U-shaped feeding cut line 108. The open end portion 109*b* of the feeding cut line 108 is oriented toward the trailing or rear end of the label strip 110*c* in like manner as the foregoing embodiments and the connected portion 109*a* is disposed toward the leading or front end.

In all of the above-described embodiments, the strips of label material 101 are all provided with feeding tongues 101*b*. However, in the aforementioned folding edge feeding system, since the label pieces 101*a* are not pierced by feeding pins 22, the longitudinal feeding cut lines 106 can be omitted. Furthermore, the feeding tongue in the label material can be formed if only one feeding cut line 106 is provided, so that the invention is not restricted to two feeding cut lines 106 for each parting cut line 105 which is the version illustrated in the above embodiments.

The label strip of the present invention has a number of advantages.

The feeding tongues are formed by feeding cut lines in an unclosed shape and they are formed at least in the strip of backing material, and usually also in the strip of label material. The free end portions of the feeding tongues in the backing material are oriented to face toward the rear or trailing end of the label strip as it is being advanced, while the attached connected portions of the feeding tongues are oriented toward the leading or front end of the label strip as it is being advanced. Therefore, the label strip is prevented from tearing which may be caused by the inertia of the advancing label strip and by the contact of the feeding tongues with the bottom cover. The latter contact could also result in the feeding tongues being folded up when the backing strip is bent rearwardly. Accordingly, the strip of backing material can be reliably engaged with the feeding pins of the feeding roller, and this results in reliable advancing of the complete label strip.

Since the strip of label material having feeding tongues formed by cut lines is laminated with the strip of backing material having the feeding tongues, even when both layers of material are laminated, they can be brought into engagement with the feeding pins of the feeding roller. Therefore, advancement of the label strip can be reliably attained.

Although the present invention has been described in connection with a plurality of preferred embodiments of preferred versions thereof, many variations and modifications will now become apparent to those skilled in the art. It is preferred, therefore, that the present invention be limited not by the specific disclosure herein, but only by the appended claims.

What is claimed is:

1. A pressure sensitive label strip, comprising:

a tape like strip of label material; a tape like strip of backing material; said strip of label material being overlaid on and separably adhered by adhesive material to said strip of backing material;

parting cut lines extending transversely across said strip of label material and being spaced at regular intervals so as to form a plurality of unit label pieces of said label strip material;

a plurality of first feeding tongues arrayed at spaced intervals along the length of said strip of backing material; each said first tongue of said plurality being at a position corresponding to the position of a said parting cut line on said strip of label material; each said first feeding tongue being defined by a feeding cut through said strip of backing material; each said first feeding tongue feeding cut being in the shape of an unclosed geometric figure and having an open uncut side by which said feeding tongue is connected to said strip of backing material; said open uncut sides of said first feeding tongue feeding cuts all facing downstream along the path of motion of said strip as said strip is advanced, whereby when each said first feeding tongue is engaged, it is upraised in the forward direction of the motion of said label strip;

at least one respective feeding cut line, which is formed at and which crosses each said parting cut line in said strip of label material; said at least one feeding cut line at each said parting cut line having generally the same shape as said at least one feeding cut line at the other said parting cut lines; each said at least one feeding cut line in combination with its respective said parting cut line, being differently shaped than said feeding cut of a respective said first feeding tongue, thereby to define a second feeding tongue in said strip of label material at each said parting cut line; each said second feeding tongue being placed to overlie a respective said first feeding tongue of said strip of backing material.

2. The label strip of claim 1, wherein each said parting cut line defines two adjacent unit label pieces in said strip of label material which are bordered by the respective said parting cut line; at each said parting cut line there are two said feeding cut lines extending across the respective said parting cut line and into the trailing end of the said unit label piece adjacent to that said parting cut line and downstream thereof in the direction of the advancing motion of said label strip; said two feeding cut lines being separated sufficiently that said strip of label material will not normally tear to define an unclosed geometric figure including said two feeding cut lines and the tear; each said second tongue being defined between said two feeding cut lines and the respective said parting cut line and being located at the trailing end of a respective said unit label piece.

3. The label strip of claim 2, in which each said first feeding tongue and its said feeding cut are of a U-shape having a closed web end of the U which is oriented to extend upstream of the advancing motion of said label strip.

4. The label strip of claim 3, in which each said feeding tongue is of a generally squarish U-shape.

5. The label strip of claim 3, in which each said feeding tongue and its said feeding cut are of a V-shape having an apex of the V which is oriented to extend upstream of the advancing motion of said label strip.

6. The label strip of claim 2, wherein said first feeding tongue feeding cut includes two spaced apart feeding cut line arms extending along the length direction of said strip of backing material.

7. The label strip of claim 6, wherein the positions of said feeding cut line arms of one said feeding tongue in said layer of backing material are aligned beneath a respective pair of said feeding cut lines in said strip of label material.

8. The label strip of claim 6, wherein the positions of said feeding cut line arms of one said feeding tongue in said layer of backing material are slightly misaligned from being located beneath a respective pair of said feeding cut lines in said strip of label material.

9. The label strip of claim 8, wherein said feeding cut line arms on said layer of backing material are spaced apart a greater distance than the respective said feeding cut lines on said strip of label material.

10. The label strip of claim 9, wherein said feeding cut lines are both located between the respective said feeding cut line arms.

11. The label strip of claim 9, wherein said feeding cut lines of said strip of label material are spaced apart a greater distance than the respective said feeding cut line arms of said layer of backing material.

12. The label strip of claim 11, wherein said feeding cut line arms are both located between the respective said feeding cut lines.

13. The label strip of claim 2, wherein each said feeding cut line also extends into the leading end of the other said unit label piece that is adjacent to the respective said parting cut line across which each said feeding cut line extends.

14. The label strip of claim 1, wherein said strip of label material has an adhesive layer on one side thereof and said strip of backing material has a release layer on one side thereof; said adhesive layer being overlaid on said release layer, and said adhesive layer being peelable from said release layer.

15. The label strip of claim 1, wherein said label strip is wound and includes a leading end which is the end thereof that is downstream in the direction of advancing motion of said label strip and is the end thereof that is first unwound and said feeding tongue feeding cut open uncut sides facing downstream of the direction of advancing motion of said label strip.

16. The label strip of claim 1, in which each of said unit label pieces is provided with additional cut lines shaped and placed for causing tearing of a unit label piece along a said additional cut line upon an attempt to remove an attached said unit label piece.

17. A pressure sensitive label strip, comprising:

a tape-like strip of a label material having a rear side and a tape-like strip of backing material having a front side; said rear side of said strip of label material and said front side of said strip of backing material being separably adhered together by adhesive material;

a plurality of parting cut lines extending transversely across said strip of label material and being spaced at regular intervals so as to form a plurality of unit label pieces of said label material;

pairs comprising two first feeding cut lines being defined across said parting cut lines in said label material; said two feeding cut lines of each said pair being separated sufficiently that said label material will not normally tear to define an unclosed geometric figure including said two feeding cut lines and the tear; each said feeding cut line pair and the respective said parting cut line forming respective feeding tongues of said unit label pieces;

second feeding cut lines being defined in said backing material and each being in the shape of an unclosed geometric figure to form a respective feeding tongue in said backing material at a position generally corresponding to a respective said pair of first feeding cut lines of said label material, and the positions of said second feeding cut lines of said backing material not being in accurate alignment with the respective said pairs of first feeding cut lines of said label material.

18. The label strip of claim 17, in which the spacing between said pairs of first feeding cut lines formed in said label material is larger than the spacing between the respective said second feeding cut lines formed in said backing material.

19. The label strip of claim 17, in which the spacing between said pairs of first feeding cut lines formed in said label material is smaller than the spacing between the respective said second feeding cut lines formed in said backing material.

20. The label strip of claim 17, in which each of said unit label pieces is provided with additional cut lines shaped and placed for causing tearing of a unit label piece along a said additional cut line upon an attempt to remove an attached said unit label piece.

21. The label strip of claim 17, in which said feeding tongues formed in said backing material are each in the shape of an unclosed geometric figure which is defined by generally U-shaped said second feeding cut lines and the web portion of each said U-shaped second feeding cut line being oriented in the direction reverse to the advancing of said label strip.

22. The label strip of claim 21, wherein said U-shaped second feeding cut line is generally rectangular.

23. The label strip of claim 22, in which said feeding tongues formed in said backing material are each in the shape of an unclosed geometric figure which is defined by generally V-shaped said second feeding cut lines and the pointed portion of each said V-shaped second feeding cut line being oriented in the direction reverse to the advancing of said label strip.

* * * * *